United States Patent
Lin et al.

(10) Patent No.: US 8,426,076 B2
(45) Date of Patent: Apr. 23, 2013

(54) FUEL CELL

(75) Inventors: Lifun Lin, Lincoln, MA (US); Jean-Pei Jeanie Cherng, Sudbury, MA (US)

(73) Assignee: Bose Corporation, Framingham, MA (US)

( * ) Notice: Subject to any disclaimer, the term of this patent is extended or adjusted under 35 U.S.C. 154(b) by 1745 days.

(21) Appl. No.: 11/746,426

(22) Filed: May 9, 2007

(65) Prior Publication Data

US 2008/0280168 A1    Nov. 13, 2008

(51) Int. Cl.
*H01M 8/04* (2006.01)
*H01M 8/00* (2006.01)

(52) U.S. Cl.
USPC ............ 429/456; 429/457; 429/483; 429/514

(58) Field of Classification Search .......................... None
See application file for complete search history.

(56) References Cited

U.S. PATENT DOCUMENTS

| | | | |
|---|---|---|---|
| 6,284,399 B1 | 9/2001 | Oko | |
| 6,638,657 B1 * | 10/2003 | Cisar et al. | 429/435 |
| 6,864,005 B2 | 3/2005 | Mossman | |
| 2002/0058168 A1 * | 5/2002 | Voss et al. | 429/13 |
| 2003/0039877 A1 * | 2/2003 | Dufner et al. | 429/34 |
| 2003/0228507 A1 | 12/2003 | Hsu et al. | |
| 2005/0181264 A1 | 8/2005 | Gu | |
| 2006/0008695 A1 * | 1/2006 | Bai et al. | 429/38 |
| 2006/0240308 A1 | 10/2006 | Formanski et al. | |
| 2011/0045371 A1 * | 2/2011 | Darling et al. | 429/437 |

FOREIGN PATENT DOCUMENTS

| | | |
|---|---|---|
| EP | 1 612 875 | 1/2006 |
| EP | 1612875 A * | 1/2006 |
| WO | WO00/25377 | 5/2000 |
| WO | WO2006/071580 | 7/2006 |

OTHER PUBLICATIONS

International Search Report and Written Opinion in Application No. PCT/US2008/062265, dated Jul. 28, 2008.
Fu and Pasaogullari, An Internal Water Management Scheme for Portable Polymer Electrolyte Fuel Cells, Proceedings of FUELCELL2006, The 4$^{th}$ International Conference on Fuel Cell Science, Enginnering and Technology, Jun. 19-21, 2006, Irvine, CA, pp. 1-8, Copyright 2006 by ASME.

* cited by examiner

*Primary Examiner* — Barbara Gilliam
*Assistant Examiner* — Angela Martin
(74) *Attorney, Agent, or Firm* — Brian M. Dingman; Dingman IP Law, PC

(57) ABSTRACT

A fuel cell includes a membrane electrode assembly (MEA), a fuel delivery system distributing fuel to an anode side of the MEA, and a flow distributor delivering an oxidizer to a cathode side of the MEA. The flow distributor includes at least one serpentine channel through which the oxidizer is delivered to the cathode side of the MEA. Each portion of the serpentine channel delivers oxidizer to a portion of the cathode side of the MEA in contact, directly or through a porous diffuser, with the channel portion. The channel portion transfers water with the portion of the MEA in contact with the channel portion and also transfers water between adjacent channel portions via a water-permeable, gas impermeable material that defines at least a portion of the channel.

19 Claims, 10 Drawing Sheets

FUEL CELL

BACKGROUND

The present invention relates to polymer electrolyte fuel cells (PEFCs).

FIG. 1 is a diagram illustrating a typical PEFC. In FIG. 1, a membrane electrode assembly (MEA) 150 is sandwiched between a fuel delivery system 120 and an oxidizer delivery system 180. The MEA 150 includes a polymer electrolyte membrane (PEM) 155, an anode catalyst layer 154 on an anode surface of the PEM 155, an anode diffusion layer 153 covering the anode catalyst layer 154, a cathode catalyst layer 156 on a cathode surface of the PEM 155, and a cathode diffusion layer 157 covering the cathode catalyst layer 156.

The PEM is a proton-permeable, electrically non-conductive membrane that allows protons to travel through the PEM from the anode to the cathode while preventing electrons from passing through the PEM. An example of a PEM typically used in fuel cells is a perfluorosulfonic acid membrane such as sulfonated tetrafluorethylene copolymer membranes available as Nation® plastic membrane from E.I. Dupont de Nemours and Company of Wilmington, Del. The anode catalyst layer 154 includes a catalyst such as platinum for increasing the anode reaction rate. The anode diffusion layer 153 is typically a porous electrical conductor such as carbon paper or cloth that conducts electrons generated by the anode reaction from the anode catalyst layer 154 to an external load while allowing transport of anode reaction reactants and products between the anode catalyst layer 154 and fuel delivery system 120. The cathode catalyst layer 156 includes a catalyst such as platinum for increasing the cathode reaction rate. The cathode diffusion layer 157 is typically a porous electrical conductor such as carbon paper or cloth that conducts electrons from the external load to the cathode catalyst layer 156 while allowing transport of cathode reaction reactants and products between the cathode catalyst layer 156 and the oxidizer delivery system.

Fuel delivery system 120 delivers fuel 123 to the anode catalyst layer 154 and removes reaction products 127, if any, from the anode. Fuel delivery system 120 may include a flow distributor that distributes the fuel evenly over the anode side of the MEA, a reformer when methanol is the fuel, a humidifier to control water content at the anode, and valves and pumps to control the flow of materials into and out of the anode. Typically, the reformer, humidifier, and pumps are housed external to the fuel cell but contribute to the overall portability of the fuel cell, in a hydrogen fuel cell, where the fuel is hydrogen, no reaction products are produced at the anode side. When the fuel is methanol, the methanol can either be converted to hydrogen using a reformer or can be applied directly to the anode. When a reformer is used, water must be supplied to the methanol and carbon dioxide removed from the reaction products. The reformer and its associated water management system adds bulk to the overall fuel cell and reduces the portability of the fuel cell. When methanol is fed directly to the anode, the fuel cell is called a direct methanol fuel cell (DMFC) and water must be supplied with the methanol to the anode catalyst layer at the anode. If sufficient water is not provided at the anode, the methanol may be incompletely oxidized to form reaction products such as formaldehyde or formic acid. The incomplete oxidation of the fuel reduces the energy generated by the fuel cell and decreases the efficiency of the fuel cell.

Oxidizer delivery system 180 delivers oxidizer 183 to the cathode catalyst layer 156 and removes reaction products 187 from the cathode. Oxidizer 183 is generally oxygen and may be conveniently provided as air although pure oxygen or enriched air may be used as the oxidizer 183. Protons from the anode recombine with the oxidizer at the cathode to produce water as a cathode reaction product 187. The water produced at the cathode may be supplied to the fuel delivery system in a DMFC. If water removal from the cathode is inefficient, cathode catalyst flooding may occur where excess liquid water coats the catalyst particles and reduces the ionization of the oxidizer at the cathode. If too much water is removed from the cathode, the PEM may dry out and reduce the conductivity of protons through the PEM. Oxidizer delivery system may include a flow distributor that distributes the oxidizer over a cathode surface of the MEA, a humidifier, a water reservoir, and pumps, blowers, and valves to control the material flows to and from the cathode. Typically, the humidifier, reservoir, pumps, and valves are housed external to the fuel cell but contribute to the overall hulk of the fuel cell.

The use of external pumps, humidifiers, and reservoirs detract from the portability advantage of a DMFC. Therefore, there remains a need for DMFC systems having reduced numbers of external components for increased portability.

SUMMARY

A fuel cell Includes a membrane electrode assembly (MEA), a fuel delivery system distributing fuel to an anode side of the MEA, and a flow distributor delivering an oxidizer to a cathode side of the MEA. The flow distributor Includes at least one serpentine channel through which the oxidizer is delivered to the cathode side of the MEA. Each portion of the serpentine channel delivers oxidizer to a portion of the cathode side of the MEA in contact, directly or through a porous diffuses with the channel portion. The channel portion transfers water with the portion of the MEA in contact with the channel portion and also transfers water between adjacent channel portions via a water-permeable, gas impermeable material that defines at least a portion of the channel.

One embodiment of the present invention is directed to a fuel cell comprising: a membrane electrode assembly having an anode side and a cathode side; a fuel delivery system distributing fuel to the anode side of the membrane electrode assembly; and a flow distributor delivering an oxidizer to the cathode side of the membrane electrode assembly and internally humidifying the oxidizer. In one aspect, the flow distributor further comprises: a channel wall layer; and a channel backing layer, the channel backing layer and channel wall layer coacting with the membrane electrode assembly to form a flow channel, the flow channel providing a path for oxidizer delivery to the membrane electrode assembly. In another aspect, the flow channel follows a serpentine path over a surface of the membrane electrode assembly, in another aspect, a first portion of the flow channel is infernally humidified by transfer of water between the first portion of the flow channel and a second portion of the flow channel the second portion of the flow channel adjacent to the first portion of the flow channel in another aspect, the second portion of the flow channel Is correctively coupled to the first portion of the flow channel in another aspect, water is transferred between the first portion of the flow channel and the adjacent second portion of the flow channel through the channel wall layer. In another aspect, the channel wall layer comprises a gas-impermeable, water-permeable material. In another aspect, the gas-impermeable, water-permeable material is electrically conductive, in another aspect, water is transferred between the first portion of the flow channel and the adjacent second portion of the flow channel through the channel backing layer. In another aspect, the channel wall layer comprises an electrical conductor, in another aspect, the channel backing layer comprises a gas-impermeable, water-permeable material. In another aspect, the gas-impermeable, water-permeable material is electrically conductive. In another aspect, the flow distributor further comprises: a porous current collector layer in contact with the cathode side of the membrane electrode assembly; a channel wall layer; and a channel backing layer, the channel backing layer and channel wall layer coacting with the current collector layer to form a flow channel, the flow channel transporting oxidizer to the membrane electrode assembly through the porous current collector layer.

Another embodiment of the present invention is directed to a fuel cell comprising: a membrane electrode assembly; a fuel delivery system configured to deliver fuel to an anode side of the membrane electrode assembly; a flow distributor having at least one flow channel the flow channel having a first channel portion and a second channel portion, the first and second channel portions providing oxidizer to a cathode side of the membrane electrode assembly and transferring water between the first channel portion and the second channel portion. In one aspect, water is transferred between the first channel portion and the second channel portion through a wall structure between the first channel portion and the second channel portion. In a further aspect, the wall structure comprises a gas-impermeable, water-permeable material. In another aspect, water is transferred between the first channel portion and the second channel portion through a channel backing layer, in further aspect, the channel backing layer comprises a gas-impermeable, water-permeable material.

Another embodiment of the present invention is directed to a method of distributing water over a cathode side of a membrane electrode assembly of a fuel cell comprising: providing a fuel cell including a membrane electrode assembly, a fuel delivery system distributing fuel to an anode side of a membrane electrode assembly, and a flow distributor having at least one flow channel characterized by a flow channel boundary, a first portion of the flow channel boundary shared by a portion of the flow channel and a portion of the cathode side of the membrane electrode assembly, a second portion of the flow channel boundary shared by a second portion of the flow channel and a water-permeable material; transferring water between the flow channel and the cathode side of the membrane electrode assembly through the first portion of the flow channel boundary; and transferring water between the flow channel and an adjacent flow channel through the water-permeable material. In one aspect, the method further comprises pumping an oxidizer through the flow channel, the oxidizer flow convectively transporting water transferred from the cathode side of the membrane electrode assembly through the first portion of the flow channel boundary.

DETAILED DESCRIPTION

Figure 1:
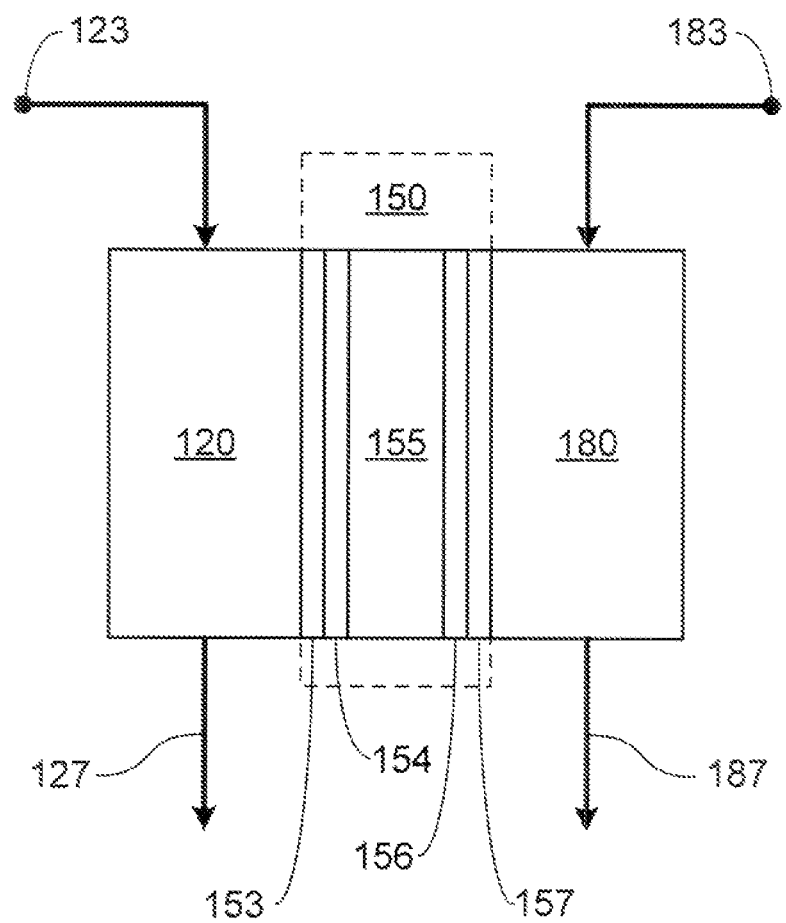
FIG. 1 is a diagram of a fuel cell system.
Figure 2:
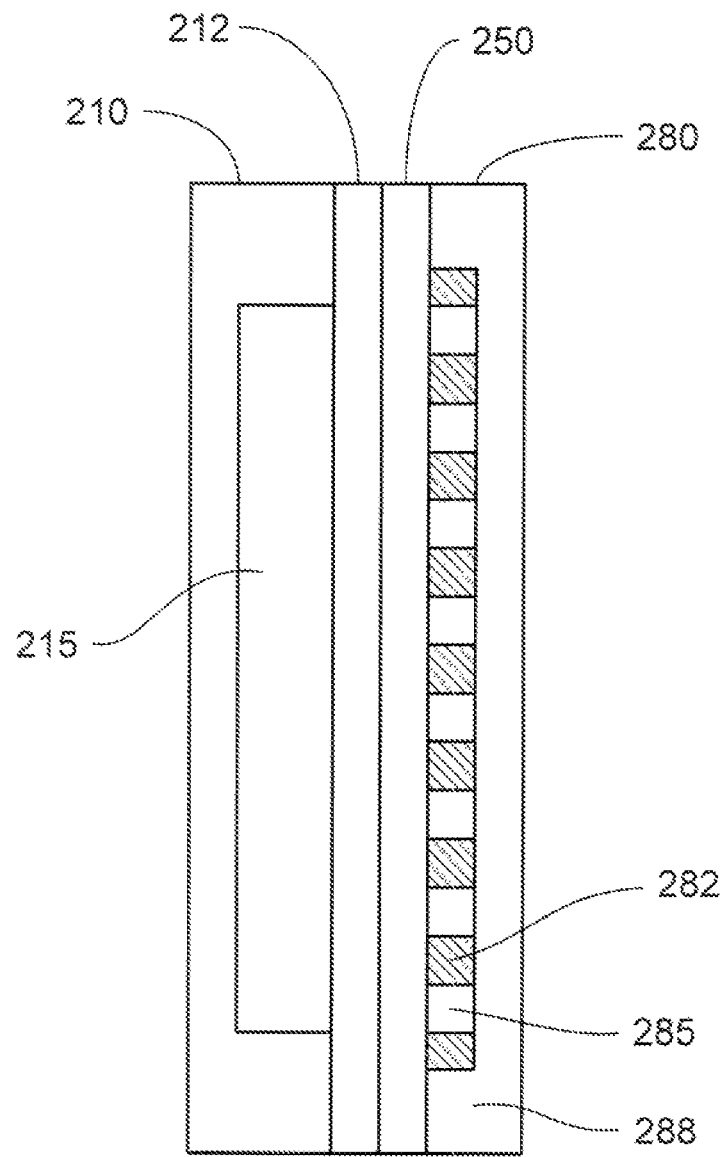
FIG. 2 is a sectional view of an embodiment of the present invention.

In FIG. 2, methanol is introduced into an anode plenum volume 215 enclosed by plenum housing 210 and anode current collector 212. The anode current collector 212 may be a porous electrical conductor that electrically conducts electrons from an MEA 250 to an external load and may also provide mechanical support for the electrical connection to the external load. The methanol fuel diffuses from the plenum volume 215, through the porous anode current collector 212 before reaching an anode surface of an MEA 250. Anode current collector 212 may be a bi-continuous structure having a first continuous phase comprising an electrical conductor and a second continuous phase allowing transport of fuel from anode plenum volume 215 to the MEA 250. The second continuous phase may be voids or spaces occupied by gas. Examples of bi-continuous anode current collectors include a perforated metal plate, a porous metal foam, and an expanded metal mesh. The metal is preferably a corrosion resistant metal such as, for example, titanium and stainless steel. The metal phase of the bi-continuous anode current collector provides an electrical conduction path and connection point for electrons created at the anode to leave the fuel cell toward a connected load. The void spaces in the metal plate or foam or mesh provide a path for diffusion of fuel to the MEA 250. Although FIG. 2 illustrates a configuration where the anode current collector and plenum housing are distinct structures, alternative embodiments include configurations where the anode current collector and plenum housing are a same component.

The plenum housing 210 includes a through passage allowing transport of methanol from a fuel source, not shown, to the plenum volume 215. A fuel source of high concentration (greater than 90%) liquid methanol is preferred for portability although lower concentrations of liquid methanol may be used. In some embodiments, a flow resistance may be placed between the liquid fuel source and the plenum volume 215 to limit the rate at which methanol enters the plenum volume 215 without the use of an external pump. Examples of a flow resistance include polymer membranes such as silicone and polyurethane. In some embodiments, liquid methanol from the fuel source may be routed through a heated passage in the plenum housing 210 to vaporize the liquid methanol before it reaches the plenum volume, in some embodiments, one end of a wick may be placed in a liquid fuel source and the other end of the wick located within the plenum volume 215 thereby transporting fuel from the fuel source to the plenum volume via capillary action without the use of an external pump.

Plenum housing 210 includes an exhaust passage, not shown, through the plenum housing to exhaust reaction products such as carbon dioxide from an anode reaction. The exhaust passage may include a pressure relief valve that opens when pressure in the plenum volume exceeds ambient pressure by a predetermined value. The predetermined value may be selected, for example, to prevent damage to the MEA or to maintain a desired reaction rate range.

In FIG. 2, a flow distributor 280 distributes the oxidizer to the cathode surface of the MEA. In addition to distributing the oxidizer to the cathode surface, flow distributor 280 also distributes reaction product water over the cathode surface to keep the MEA hydrated and to provide water to the anode for the anode reaction. Typically, the humidity of the inlet oxidizer flow is controlled by a humidifier located external to flow distributor 280. The external humidifier, however, adds bulk to the overall fuel cell system and reduces the portability of the fuel cell system. The external humidifier humidities the inlet oxidizer flow from an external water reservoir. The outlet flow stream exiting the flow distributor generally has a higher humidity than the inlet oxidizer flow from water produced in the cathode reaction. Water in the exiting flow may be recovered and stored in the external reservoir. In contrast, the exemplar flow distributor 280 shown in FIG. 2 eliminates the need for an external humidifier by incorporating a water mass exchanger internal to the flow distributor.

Flow distributor 280 includes a housing 288, one or more wall structures 282 that in combination with housing 288 and MEA 250, creates or defines a boundary surface of one or more flow channels 285 providing a flow path distributing oxidizer to the cathode side of MEA 250. The one or more flow channels are characterized by the boundary surface. A portion of the boundary surface provides an Interface between the flow channel 285 and the MEA 250. Another portion of the boundary surface provides an interface between the flow channel 285 and wall structure 282. Another portion of the boundary surface provides an interface between the flow channel 285 and housing 288. In FIG. 2, wall structure 282 preferably comprises a water-permeable, electrically-conductive material such as, for example, a bi-continuous metal matrix composite having a continuous metal matrix phase and a continuous water-permeable polymer phase. Examples of water-permeable polymers include polyvinyl alcohol, polyacrylic acid, and polyhydroxyethyl methacrylate. The water-permeable walls enable water transfer between the flow channels 285 sharing a common wall 282 thereby distributing water laterally to the oxidizer flow direction.

Housing 288 may be an electrically-conductive material that, together with the electrically-conductive walls 282, provides an electrical path for transport of electrons from an external load to the cathode. In some embodiments, housing 288 and walls 282 may be the same material enabling the manufacture of a single-piece flow distributor via mold casting or milling. In some embodiments, an electrically-conductive, porous current collector may be placed between the MEA 250 and the flow distributor 280 to provide a connection to an external load and to provide electrons for the cathode-side reaction combining the electrons, oxidizer, and protons diffusing through the MEA from the anode to form water. The porosity and pore size of the porous current collector may be selected to maintain a low electrical resistance while allowing sufficient mass transfer of oxidizer and water between the cathode catalyst layer of the MEA and the flow channel. Examples of porous current collector materials include acid-resistant sintered powder metals such as stainless steel and titanium, sintered graphite, expanded metal mesh, and metal foam. When a separate current collector is used, the flow distributor may be electrically non-conductive.

Figure 3:
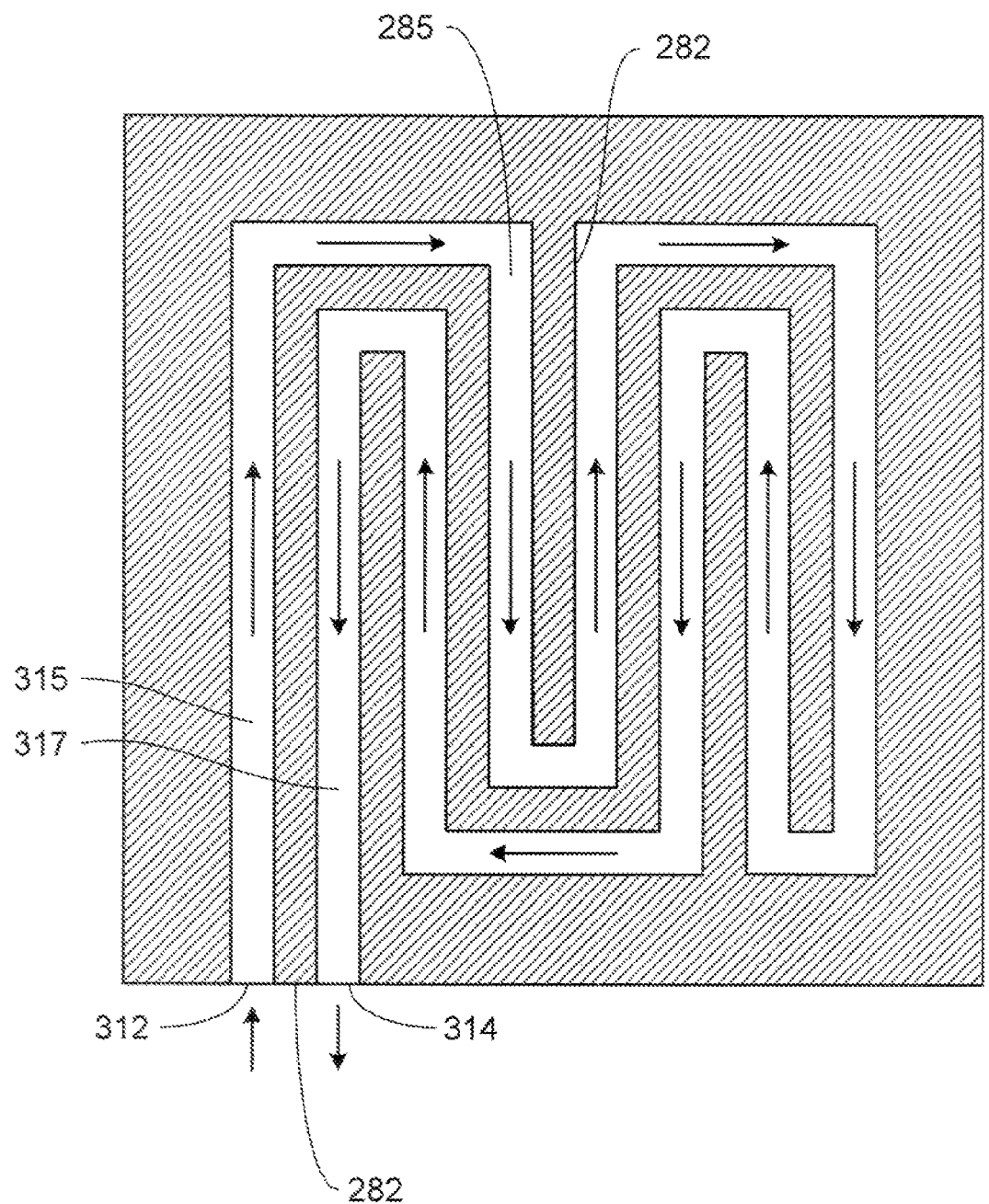
FIG. 3 is a plan view of an exemplar flow distributor.

FIG. 3 shows a plan view of a flow distributor having an Internal humidifier. A single serpentine flow channel 285 is defined by one or more walls 282 and has an inlet 312 and outlet 314, inlet 312 or outlet 314 provides connection to a fluid mover such as a pump, a compressor, or a blower. The fluid mover may be located downstream of the outlet 314 and configured to draw the oxidizer flow through flow channel 285 or may be located upstream of the inlet to push the oxidizer flow through flow channel 285. For illustrative purposes, the direction of flow is indicated by arrows but is not limited to the indicated direction. Wall 282 preferably comprises a gas-impermeable material such that the oxidizer flow is substantially confined along the flow channel 285. A gas mass transfer rate through the wail may include gaseous diffusion through the wall and gas convective transport when the wall is porous and a pressure difference exists between the adjacent channel portions. As used herein, a material is gas-impermeable when gaseous mass flux through the wall is less than 15% of the mass flux through the flow channel 285.

In FIG. 3, the serpentine flow channel 285 is arranged such that inlet portion 315 of channel 285 is adjacent to outlet portion 317 of channel 285. As used herein, a first portion of a channel is adjacent to a second portion of a channel when a single wall portion separates the two channel portions and there are no other channel portions or wall portions between the first and second channel portions. The second portion of the channel may be part of the same channel as the first portion of the channel or may be part of a second channel.

Without being limiting, it is assumed that the humidity difference between the inlet portion and the outlet portion creates a large driving force for water mass transfer from the relatively high humidity outlet portion of channel 285 to a relatively low humidity inlet portion of channel 285 through wall 282. The large driving force increases the humidity of the inlet oxidizer flow in the inlet portion 315 and decreases the loss of water from the portion of the MEA underlying the inlet portion 315 of channel 285.

Figure 4A:
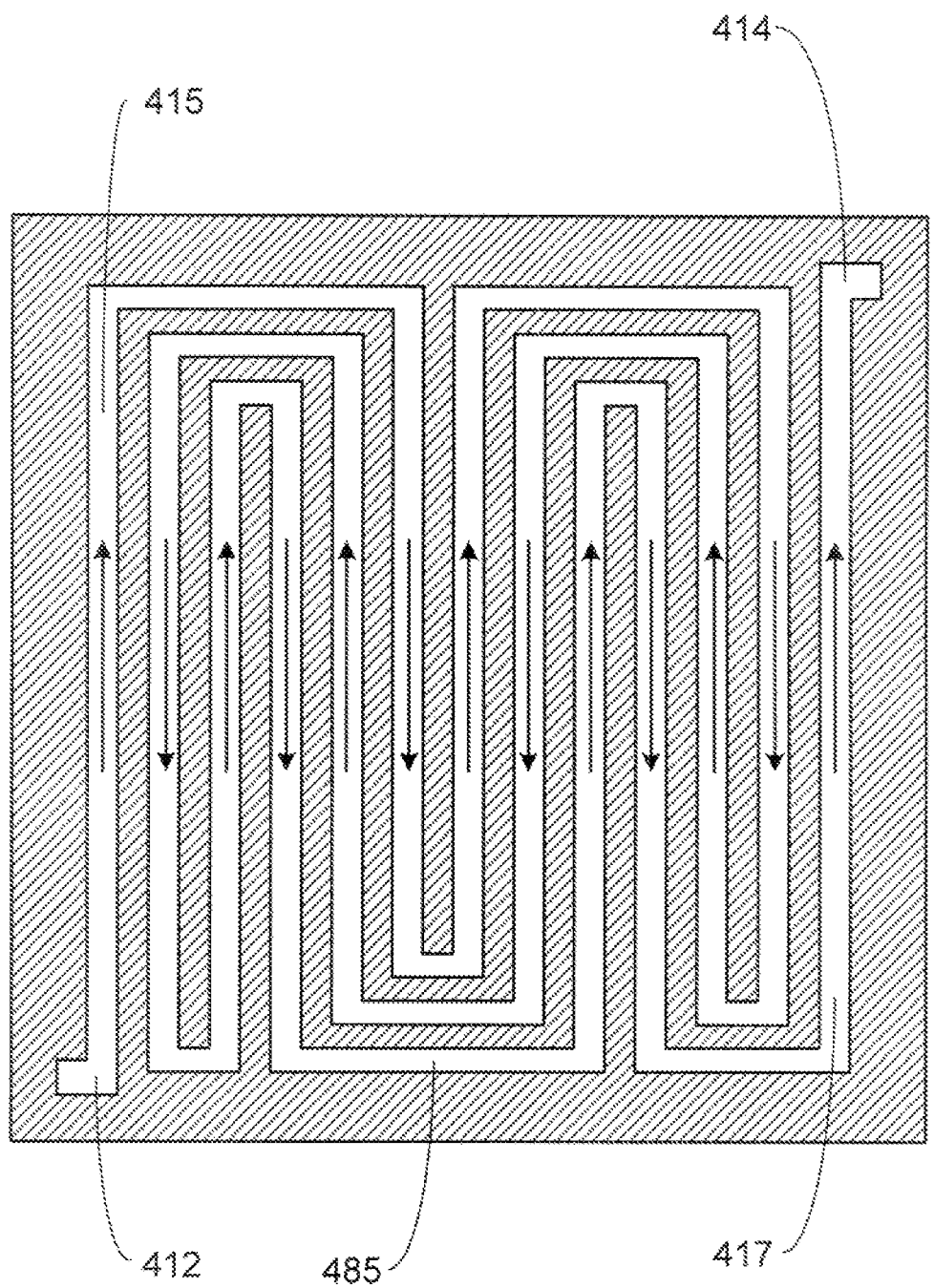
FIG. 4a is a plan view of another exemplar flow distributor.
Figure 4B:
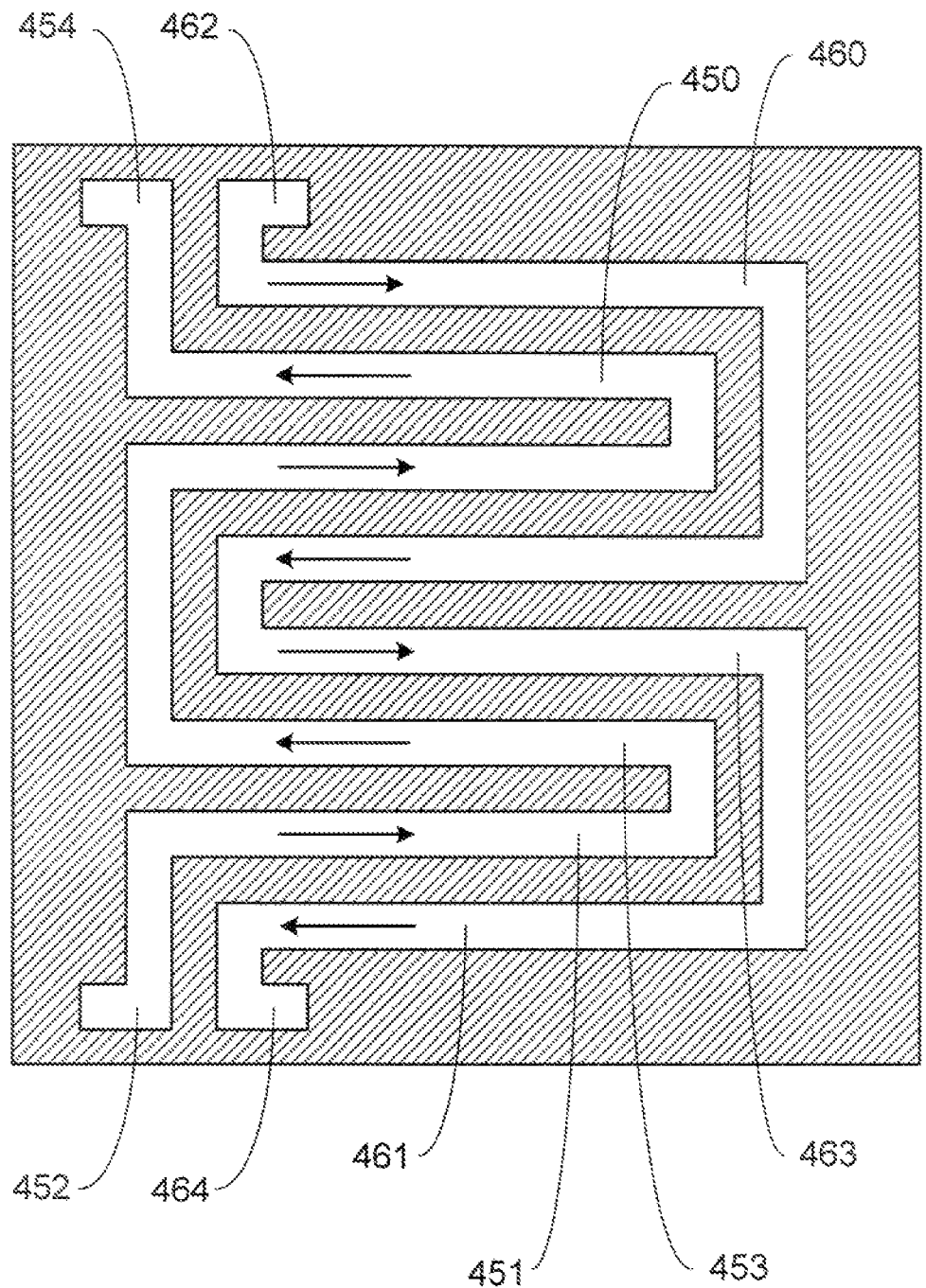
FIG. 4b is a plan view of another exemplar flow distributor.
Figure 4C:
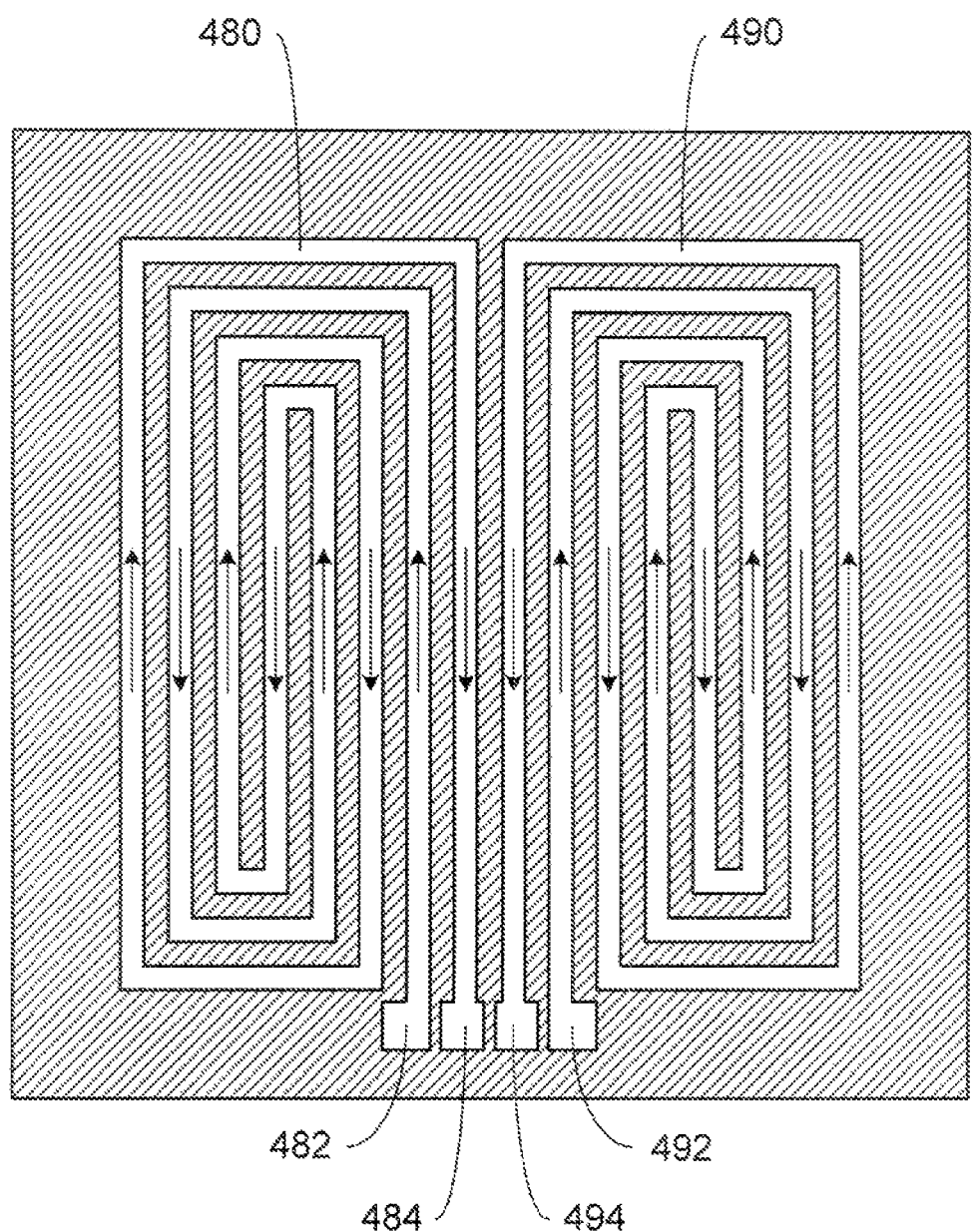
FIG. 4c is a plan view of another exemplar flow distributor.

The serpentine channel pattern and the locations of the inlet and outlet shown in FIG. 3 are not intended to be limiting and other patterns and locations may be employed that are within the scope of the present invention. For example. In FIG. 4a, the inlet 412 and outlet 414 of channel 485 are diagonally opposite of each other and inlet channel portion 415 is not adjacent to outlet channel portion 417. FIG. 4b illustrates another example of a serpentine channel pattern where two channels 450 460 are used to internally humidify the oxidizer flow and where the locations of the inlet 452 462 and outlet 454 464 for the two channels are located along the side of the flow distributor. A portion of a flow channel is convectively coupled to another portion of the flow channel when both portions are part of the same flow channel. Conversely, a portion of a flow channel is convectively isolated from another portion of a flow channel when each portion belongs to a different flow channel. For example, portion 461 is convectively coupled to portion 463 but is convectively isolated from portion 451. Similarly, portion 451 is convectively coupled to portion 453 but is convectively isolated from portion 463. FIG. 4c illustrates another example of a serpentine channel pattern where two channels 480 490 have inlets 482 492 and outlets 484 494 along a side of the fuel cell and include channel portions having flow parallel to an adjacent channel portion.

The serpentine channel patterns shown in FIGS. 3, 4a, 4b, and 4c illustrate some of a wide variety of channel patterns but are not intended to be limited to the shown patterns. The channel pattern may be selected to balance one or more competing criteria such as, for example, MEA area coverage, channel head loss, channel leakage, and humidity differences between adjacent channels. For example, a channel pattern may be selected such that the average humidity difference between adjacent channels is large in order to promote water transfer between adjacent channels.

Figure 4D:
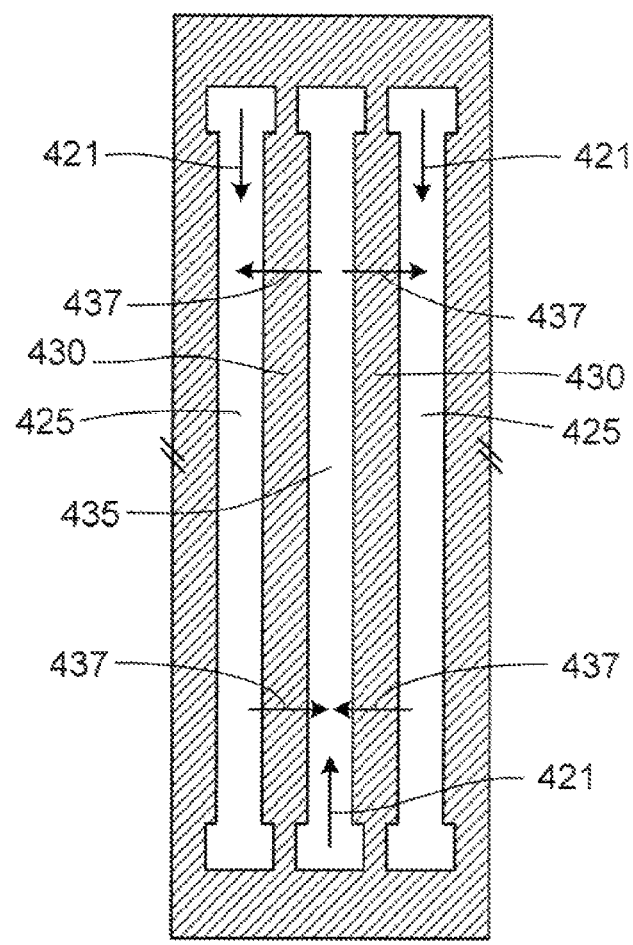
FIG. 4d is a plan view of another exemplar flow distributor.

FIG. 4d Illustrates another example of a channel pattern where a serpentine path is replaced by multiple straight channels. FIG. 4d illustrates a portion of the flow distributor having a straight-through flow channels 435, 437. Adjacent channels 437 are adjacent to flow channel 435 and share a common wall 430 with flow channel 435. The oxidizer flow direction in flow channels 435, 437 are indicated by arrow 421 and show a counter-flow configuration. Arrows 437 Indicate the expected directions of water transport between adjacent channels. Referring to FIG. 4d, oxidizer flowing into channel 435 is expected to have a lower humidity than the humidity of the exiting oxidizer flow In the adjacent channels 425. The humidity difference between adjacent channels creates a driving force for water mass transfer in the direction indicated by arrows 437. As the oxidizer in channel 435 flows toward an exit port, the humidity difference between adjacent channels decreases as the oxidizer in channel 435 accumulates cathode reaction product water from the underlying MEA and water from the adjacent channels until the humidity of channel 435 becomes greater than the humidity of the adjacent channel 425, at which point the direction of water mass transfer reverses and water is transported from channel 435 to the adjacent channels 425.

Figure 5:
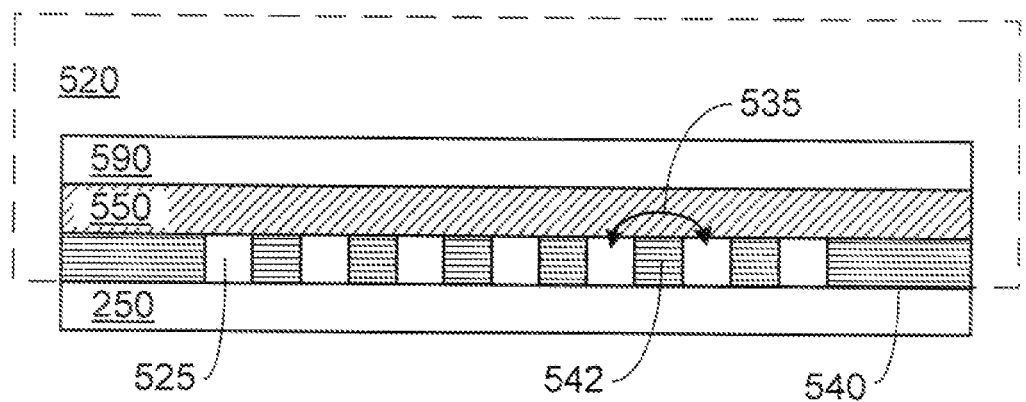
FIG. 5 is a sectional view of another embodiment of the present invention.

In FIG. 5, an electrically conductive flow distributor 520 may perform a function of a current collector by providing an electrically conductive path for electrons from a load to the cathode surface of MEA 250. Flow distributor 520 includes a channel wall layer 540, and a channel backing layer including a water-permeable layer 550, and a structural support layer 590.

In the configuration shown in FIG. 5, where the flow distributor 520 and channel wall layer 540 provide the electrical conduction path to the cathode surface of the MEA 250, the water permeable layer 550 may be an electrical insulator. Behind the water permeable layer 550, a structural support layer 590 may provide structural support for the water permeable layer 550. The structural support layer 590 may be an electrical insulator.

One or more flow channels 525 are defined by a wall 542 of the channel wall layer 540, the cathode surface of the MEA 250, and by a water permeable layer 550. A channel boundary surface contains a flow channel volume. A portion of the channel boundary is shared between the flow channel and the cathode catalyst layer of the MEA 250. Another portion of the channel boundary Is shared between the flow channel and one or more walls 542 of the channel wall layer 540. Another portion of the channel boundary is shared between the flow channel and the water-permeable layer 550. In FIG. 5, water in flow channel 525 may be transported through a portion of a channel boundary shared by the flow channel 525 and water permeable layer 550. Water may be transported through the water-permeable layer 550 to an adjacent flow channel as illustrated by double-headed arrow 535. A double-headed arrow 535 is used to indicate that the water transfer can be in either direction and generally depends on the humidity difference between the adjacent channels. The adjacent flow channel may be a downstream or upstream portion of the same serpentine flow channel as flow channel 525 or may be a portion of a different serpentine flow channel. The transfer of water between adjacent flow channels allows for another mass transfer mechanism beyond the convective mass flow within the flow channel and may enhance a more uniform distribution of water over the cathode side of the MEA 250.

Figure 6:
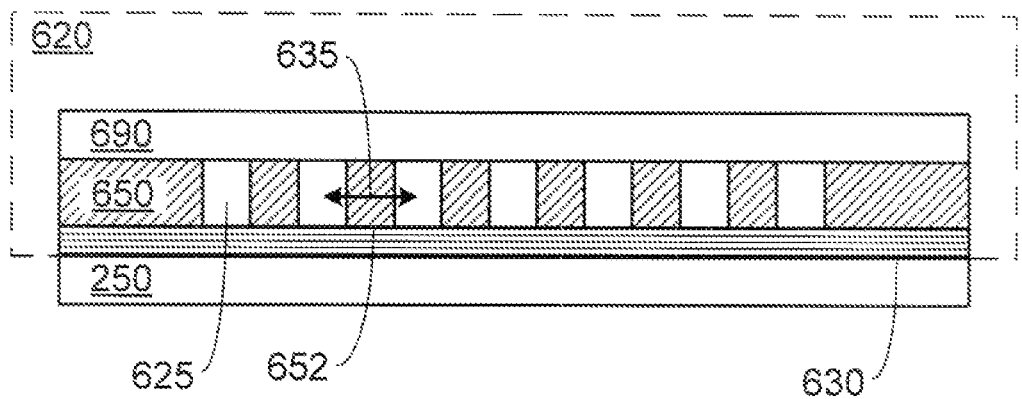
FIG. 6 is a sectional view of another embodiment of the present invention.

The water-permeable layer 550 of channel backing layer preferably comprises a gas-impermeable, water-permeable material. Examples of gas-impermeable, water-permeable materials include, without being limiting, microcellulose PVA, sulfonated tetrafluorethylene copolymer such as Nation® copolymer available from E.I. du Pont de Nemours and Company of Wilmington, Del., microporous ultra-high molecular weight polyethylene such as Lateral-Flo® membranes available from Porex Corporation of Fairburn, Ga., or microporous, silica-filled polyethylene available as Teslin® sheet from PPG Industries Ohio, Inc. of Strongsville, Ohio, FIG. 6 is a sectional view illustrating another example of a flow distributor 620 enabling internal humidification of the oxidizer flow. A porous current collector layer 630 provides an electrically conductive path to the cathode surface of the MEA while allowing mass transfer of the oxidizer from flow channel 625 to the cathode surface of the MEA 250 and allowing mass transfer of water between flow channel 625 and the cathode surface of the MEA 250. The direction of water transfer between flow channel 625 and cathode surface is expected to be related to the difference in the chemical potential of water in flow channel 625 and the chemical potential of water over the portion of the cathode surface directly under or adjacent to the flow channel. When, for example, the humidify in flow channel is high and the underlying portion of MEA is only partially hydrated due, for example, to depletion of water caused by the anode reaction, the direction of water transfer is expected to be from the flow channel to the underlying MEA. Conversely, if the MEA is fully hydrated, the direction of water transfer may be from the MEA to the flow channel in order to remove the water generated by the cathode reaction.

The porosity and pore size of the porous current collector 630 may be selected to maintain a low cathode electrical resistance while allowing sufficient mass transfer of oxidizer and water between the cathode catalyst layer of MEA 250 and the flow channel 626 to maintain a desired cathode reaction rate and/or keep the MEA 250 hydrated and/or maintain a desired anode reaction rate. Examples of porous materials include corrosion resistant sintered powder metals such as stainless steel and titanium, sintered graphite, flexible graphite sheet material, expanded metal mesh, and metal foam.

Flow channel 625 is defined by porous current collector layer 630, channel wall layer 650, and channel backing layer 690. Channel wall layer 650 is preferably comprised of a water-permeable, gas impermeable material and may be electrically insulating. Channel backing layer 690 is preferably comprised of a water-impermeable and gas impermeable material and may be electrically insulating.

In FIG. 6, a flow channel boundary surface contains the flow channel volume. A portion of the flow channel boundary Is shared between the flow channel 625 and the porous current collector layer 630. Another portion of the flow channel boundary is shared between the flow channel 625 and the channel backing layer 690. Another portion of the flow channel boundary is shared between the flow channel 625 and the water-permeable channel wall layer 650. Water In channel 625 may be transported through the portion of the flow channel boundary shared by the water-permeable channel wall layer 650, through the water-permeable intervening wall 652 to the adjacent flow channel. Double-headed arrow 635 illustrates the transfer of water between adjacent flow channels through the water-permeable channel wall layer 650. A double-headed arrow 635 is used to indicate that the water transfer can be in either direction and generally depends on the humidity difference between the adjacent channels. The adjacent flow channel may be a downstream or upstream portion of the same serpentine flow channel as flow channel 625 or may be a portion of a different serpentine flow channel. The transfer of water between adjacent flow channels allows for another mass transfer mechanism beyond the convective mass flow within the flow channel and may enhance a more uniform distribution of water over the cathode side of the MEA 250.

Channel wall layer 650 preferably comprises a gas-Impermeable, water-permeable material. Examples of gas-impermeable, water-permeable materials Include, without being limiting, microcellulose PVA, sulfonated tetrafluorethylene copolymer such as Nafion® copolymer available from E.I. du Pont de Nemours and Company of Wilmington, Del., microporous ultra-high molecular weight polyethylene such as Lateral-Flo® membranes available from Porex Corporation of Fairburn, Ga., or microporous, silica-filled polyethylene available as Teslin® sheet from PPG Industries Ohio, Inc. of Strongsville, Ohio.

Figure 7:
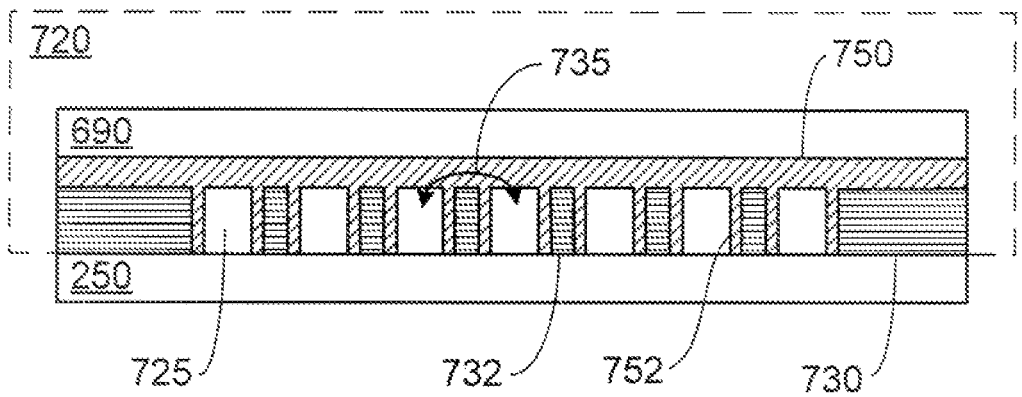
FIG. 7 is a sectional view of another embodiment of the present invention.

FIG. 7 is a sectional view illustrating another configuration of a flow distributor 720 enabling Internal humidification of the oxidizer flow. Flow distributor 720 includes an electrically conductive channel wall layer 730, and a channel backing layer including an exchange layer 750, and a structural support layer 690. The electrically conducive channel wall layer 730 provides a path to the cathode catalyst layer of the MEA 250 and forms, in combination with MEA 250 and exchange layer 750, one or more flow channels 725. The exchange layer 750 extends into the flow channels 725 to cover the wall surfaces of the channel wall layer 730 exposed to the flow channel. The exchange layer 750 preferably comprises a gas-impermeable, water-permeable but not necessarily an electrically conductive material. Channel wall layer 730 may be solid or porous and comprises a corrosion-resistant, electrically conductive material such as, for example, stainless steel, titanium, graphite or electrically conductive polymers.

A portion of a flow channel boundary enclosing flow channel 725 is shared between the flow channel 725 and MEA 250 and another portion of the flow channel boundary is shared between flow channel 725 and exchange layer 735. Water may be transported through the portion of channel boundary shared by the flow channel and exchange layer, through the exchange layer, to the adjacent flow channel as indicated by double-head arrow 735. Double-headed arrow 735 is used to indicate that the water transfer can be in either direction and generally depends on the humidity difference between the adjacent channels. The adjacent flow channel may be a downstream or upstream portion of the same serpentine flow channel as flow channel 725 or may be a portion of a different serpentine flow channel. The transfer of water between adjacent flow channels allows for another mass transfer mechanism beyond the convective mass flow within the flow channel and may enhance a more uniform distribution of water over the cathode side of the MEA 250.

Water may also be transported within the portion of the exchange layer covering the walls 732 of the channel wall layer 730 along each flow channel in a direction into or out of the plane of FIG. 7. Transport along the flow channel may be by diffusion within the exchange material.

Exchange layer 750 comprises a gas-impermeable, water-permeable material. Examples of gas-impermeable, water-permeable materials include, without being limiting, microcellulose PVA, sulfonated tetrafluorethylene copolymer such as Nafion® copolymer available from E.I. du Pont de Nemours and Company of Wilmington, Del., microporous ultra-high molecular weight polyethylene such as Lateral-Flo® membranes available from Porex Corporation of Fairburn, Ga., or microporous, silica-filled polyethylene available as Teslin® sheet from PPG Industries Ohio, Inc. of Strongsville, Ohio.

Figure 8:
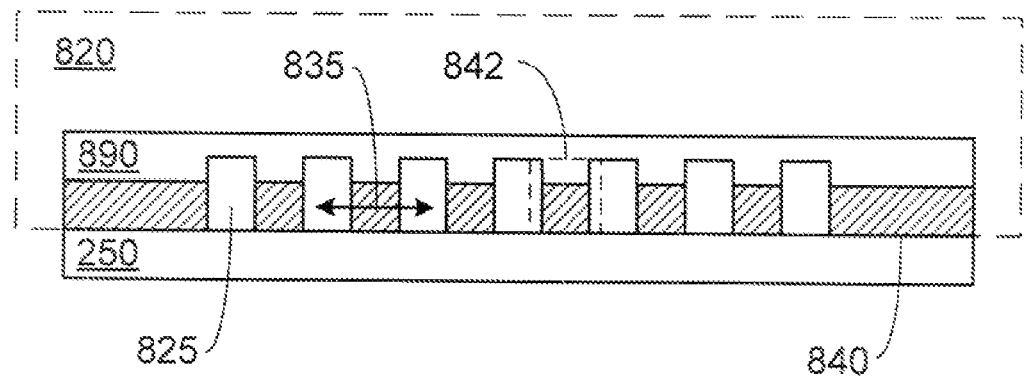
FIG. 8 is a sectional view of another embodiment of the present invention.

FIG. 8 illustrates another configuration of a flow distributor 820 enabling internal humidification of the oxidizer flow. Flow distributor 820 includes channel backing layer 890, and channel wall layer 840 that in combination with MEA 250 create one or more flow channels 825 that transport oxidizer over the surface of MEA 250 while exchanging water between the flow channels 825 and the MEA 250 and between adjacent flow channels, in FIG. 8, channel wall layer 840 comprises a portion of channel wall 842, the remaining portion of channel wall 842 defined by channel backing layer The exchange of water between adjacent flow channels occurs through the water-permeable, gas-impermeable wall material 842 as Indicated by double-headed arrow 835. In FIG. 8, the water-permeable, gas-impermeable channel wall layer 840 is electrically conductive to provide a path for electrons between a connected load and the cathode surface. Examples of water-permeable, gas-impermeable, electrically conductive materials Include a bi-continuous metal matrix composite having a continuous metal matrix and a continuous water permeable polymer phase. Examples of water permeable polymers include polyvinyl alcohol, polyacrylic acid, and polyhydroxyethyl methacrylate. The water-impermeable channel backing layer 890 is preferably an electrical conductor but may be an insulator.

Figure 9:
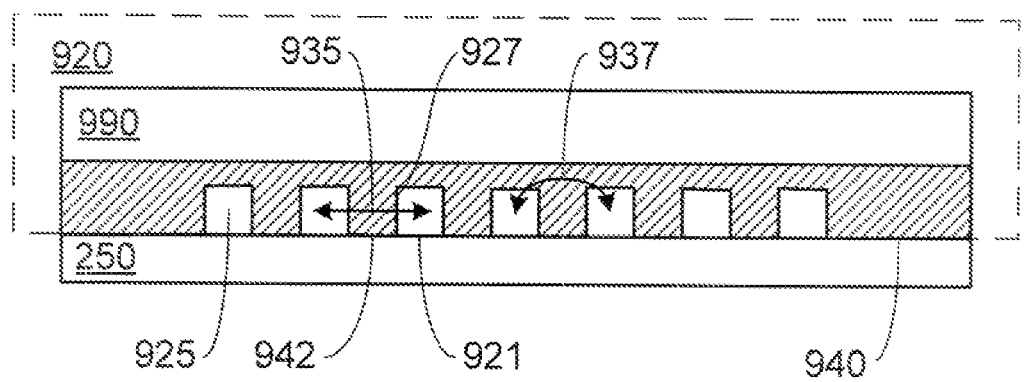
FIG. 9 is a sectional view of another embodiment of the present invention.

FIG. 9 illustrates another configuration of a flow distributor 920 enabling internal humidification of the oxidizer flow. Flow distributor 920 includes a channel wall layer 940 and a channel backing layer 990. Flow channels 925 are formed from the combination of channel wall layer 940 and MEA 250. Channel backing layer 990 may provide structural support for channel wall layer 940. Channel wall layer 940 preferably comprises an electrically-conductive, gas-impermeable, water-permeable material such as, for example, a bi-continuous metal matrix composite having a continuous metal matrix and a continuous water-permeable polymer phase. Examples of water permeable polymers include polyvinyl alcohol, polyacrylic acid, and polyhydroxyethyl methacrylate.

In FIG. 9, a portion 921 of a flow channel boundary enclosing flow channel 925 is shared between flow channel 925 and MEA 250 and another portion 927 of flow channel boundary is shared between flow channel 925 and channel wall layer 940. Water may be transported through the portion of channel boundary shared by the flow channel 925 and a wall portion 942 of the channel wall layer 940, through wall portion 942, to the adjacent flow channel, as indicated by double-headed arrow 935. Water may also be transported between flow channel 925 and a portion of the channel wall layer 940 opposite the MEA 250, through the channel wall layer 940, to the adjacent flow channel, as indicated by double-headed arrow 937. Double-headed arrows 935, 937 are used to Indicate that the water transfer can be in either direction and generally depends on the humidity difference between the adjacent channels. The adjacent flow channel may be a downstream or upstream portion of the same serpentine flow channel as flow channel 925 or may be a portion of a different serpentine flow channel. The transfer of water between adjacent flow channels allows for another mass transfer mechanism beyond the convective mass flow within the flow channel and may enhance a more uniform distribution of water over the cathode side of the MEA 250.

Figure 10:
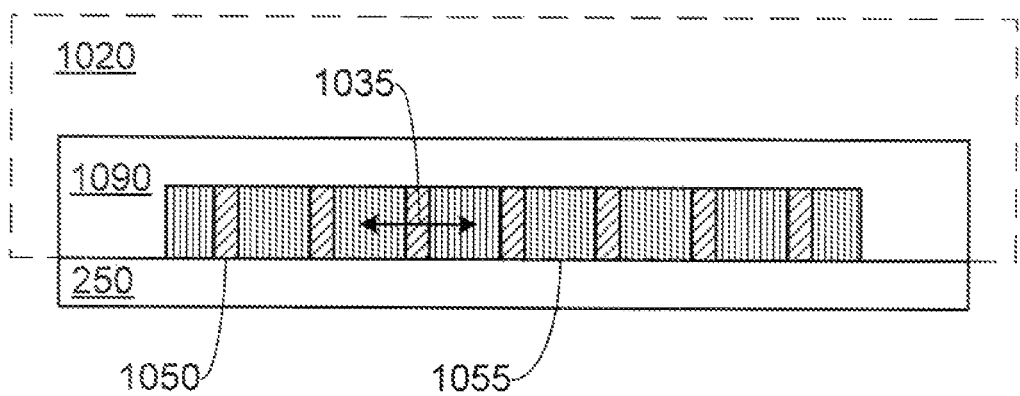
FIG. 10 is a sectional view of another embodiment of the present invention.

FIG. 10 illustrates another configuration of a flow distributor 1020 enabling internal humidification of the oxidizer flow. In FIG. 10, flow distributor housing 1090 forms a water and gas barrier containing the oxidizer flow. Oxidizer is flowed through a porous material 1055 that can transport both oxidizer and water. A serpentine flow path is defined by walls 1050 comprising a water-permeable, gas-impermeable material that channels the oxidizer flow through the porous material filling the channel and along the serpentine path. Water exchange occurs between adjacent channels through the wall separating the adjacent channels as indicated in FIG. 10 by double-headed arrow 1035.

The porosity and pore size of the porous flow channel 1055 may be selected to reduce extra pump head that may be required to pump the oxidizer through the flow distributor 1020. In some embodiments, porous flow channel 1055 may also provide an electrically conductive path to MEA 250 for electrons from a connected load. In such instances, porous flow channel 1055 preferably comprises an electrically conductive material having a porosity and pore size sufficient to maintain a low cathode electrical resistance while allowing sufficient mass transfer of oxidizer and water between the cathode catalyst layer of the MEA and the flow channel 625. Examples of porous channel materials include corrosion resistant sintered powder metals such as stainless steel and titanium, sintered graphite, expanded metal mesh, and metal foam.

Figure 11:
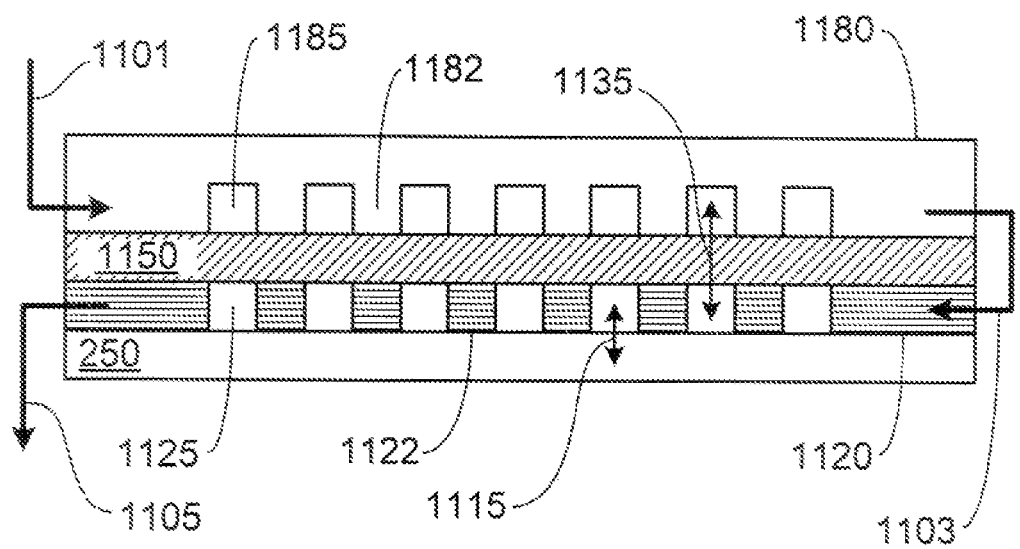
FIG. 11 is a sectional view of an external humidifier.

FIG. 11 illustrates a configuration of a flow distributor enabling external humidification of the oxidizer flow. In FIG. 11, inlet oxidizer flow 1101 is directed through one or more external flow channels 1185 defined by external housing 1180, one or more external walls 1182, and a water exchange membrane 1150. Inlet oxidizer flow 1101 is humidified by transfer of water from cathode flow channels 1125 through the water exchange membrane 1150 to the adjacent external flow channel 1185. The humidified oxidizer flow exiting the external flow channel 1185 is directed to internal flow channel 1126 as indicated by arrow 1103. Internal flow channel 1125 may include one or more serpentine flow paths. Internal flow channel 1125 is created from a combination of the water exchange membrane 1150, the MEA 250, and one or more cathode walls 1122 of cathode 1120. As the humidified oxidizer flows through the internal flow channel, the oxidizer flow transfers water to an adjacent external flow channel 1185 through the water exchange membrane 1150 as illustrated by double-headed arrow 1135 and also transfers water between the internal flow channel 1125 and the underlying MEA 250 that depends on the humidity of the internal flow channel and the water chemical potential of the underlying MEA 250. The configuration illustrated in FIG. 11 is termed external humidification because at least one external channel 1185 of the humidifier does not transfer water between the oxidizer in a portion of the external channel with a portion of the MEA 250, instead, the oxidizer flow is directed to the internal flow channel 1125 where the water exchange between the oxidizer flow stream and the MEA 250 occur as indicated by double-headed arrow 1115.

Conversely, the configurations in FIGS. 5-10 show illustrative examples of internal humidification where water is exchanged between adjacent flow channels where the flow channels deliver oxidizer to a portion of the MEA 250 underlying each respective channel and also exchange water between the flow channels through a portion of the channel boundary shared by the flow channel and a water-permeable, gas-impermeable material.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:
1. A fuel cell comprising:
a) a membrane electrode assembly having an anode side and a cathode side;
b) a fuel delivery system distributing fuel to the anode side of the membrane electrode assembly; and
c) a flow distributor delivering an oxidizer to the cathode side of the membrane electrode assembly and internally humidifying the oxidizer, wherein the flow distributor comprises:
(i) a channel wall layer comprising a gas impermeable, water permeable material;
(ii) a channel backing layer;
(iii) a flow channel that provides, a path for oxidizer delivery to the membrane electrode assembly, wherein the flow channel is defined by the membrane electrode assembly, the channel wall layer and the channel backing layer;
(iv) wherein material is gas impermeable when gaseous mass flux through the channel wall is less than 15% of the mass flux through the flow channel;
(v) wherein a first portion of the flow channel is internally humidified by transfer of water between the first portion of the flow channel and a second portion of the flow channel through the channel wall layer; and
(vi) wherein the second portion of the flow channel is separated from the first portion of the flow channel by a single channel wall layer portion, with no other channel portions or wall layer portions between the first and second flow channel portions.

2. The fuel cell of claim 1 wherein the flow channel follows a serpentine path over a surface of the membrane electrode assembly.

3. The fuel cell of claim 1 wherein the second portion of the flow channel is convectively coupled to the first portion of the flow channel.

4. The fuel cell of claim 1 wherein the gas-impermeable, water-permeable material of the channel wall layer is electrically conductive.

5. The fuel cell of claim 1 wherein the channel backing layer is water permeable such that water is transferred between the first portion of the flow channel and the adjacent second portion of the flow channel through the channel backing layer.

6. The fuel cell of claim 5 wherein the channel wall layer comprises an electrical conductor.

7. The fuel cell of claim 1 wherein the channel backing layer comprises a gas-impermeable, water-permeable material.

8. The fuel cell of claim 7 wherein the gas-impermeable, water-permeable material of the channel backing layer is electrically conductive.

9. The fuel cell of claim 1 wherein the flow distributor further comprises:
a porous current collector layer in contact with the cathode side of the membrane electrode assembly;
wherein the flow channel is further defined by the current collector layer; and
wherein the flow channel transports oxidizer to the membrane electrode assembly through the porous current collector layer.

10. The fuel cell of claim 1 wherein the flow channel has four sides, and wherein two of the sides are defined by the channel wall layer, one side is defined by the channel backing layer, and one side is defined by the membrane electrode assembly.

11. The fuel cell of claim 10 wherein the flow channel has a rectangular cross section and two non-adjacent sides of the flow channel are defined by the channel wall layer.

12. A fuel cell comprising:
a) a membrane electrode assembly having an anode side and a cathode side;
b) a fuel delivery system distributing fuel to the anode side of the membrane electrode assembly; and
c) a flow distributor delivering an oxidizer to the cathode side of the membrane electrode assembly and internally humidifying the oxidizer, wherein the flow distributor comprises:
   (i) a channel wall layer comprising an electrically-conductive, gas impermeable, water permeable material;
   (ii) a channel backing layer;
   (iii) a flow channel that provides a path for oxidizer delivery to the membrane electrode assembly, wherein the flow channel is defined by the membrane electrode assembly, the channel wall layer and the channel backing layer and wherein the flow channel follows a serpentine path over a surface of the membrane electrode assembly;
   (iv) wherein material is gas impermeable when gaseous mass flux through the channel wall is less than 15% of the mass flux through the flow channel;
   (v) wherein a first portion of the flow channel is internally humidified by transfer of water between the first portion of the flow channel and a second portion of the flow channel through the channel wall layer; and
   (vi) wherein the second portion of the flow channel is convectively coupled to the first portion of the flow channel, and wherein the second portion of the flow channel is separated from the first portion of the flow channel by a single channel wall layer portion, with no other channel portions or wall layer portions between the first and second flow channel portions.

13. The fuel cell of claim 12 wherein the channel backing layer is water permeable such that water is transferred between the first portion of the flow channel and the adjacent second portion of the flow channel through the channel backing layer.

14. The fuel cell of claim 13 wherein the channel wall layer comprises an electrical conductor.

15. The fuel cell of claim 14 wherein the channel backing layer comprises a gas-impermeable, water-permeable material.

16. The fuel cell of claim 15 wherein the gas-impermeable, water-permeable material of the channel backing layer is electrically conductive.

17. The fuel cell of claim 16 wherein the flow distributor further comprises:
   a porous current collector layer in contact with the cathode side of the membrane electrode assembly;
   wherein the flow channel is further defined by the current collector layer; and
   wherein the flow channel transports oxidizer to the membrane electrode assembly through the porous current collector layer.

18. The fuel cell of claim 17 wherein the flow channel has four sides, and wherein two of the sides are defined by the channel wall layer, one side is defined by the channel backing layer, and one side is defined by the membrane electrode assembly.

19. The fuel cell of claim 18 wherein the flow channel has a rectangular cross section and two non-adjacent sides of the flow channel are defined by the channel wall layer.

* * * * *